No. 779,701. PATENTED JAN. 10, 1905.
C. W. FRICK.
CALF WEANER.
APPLICATION FILED SEPT. 16, 1904.
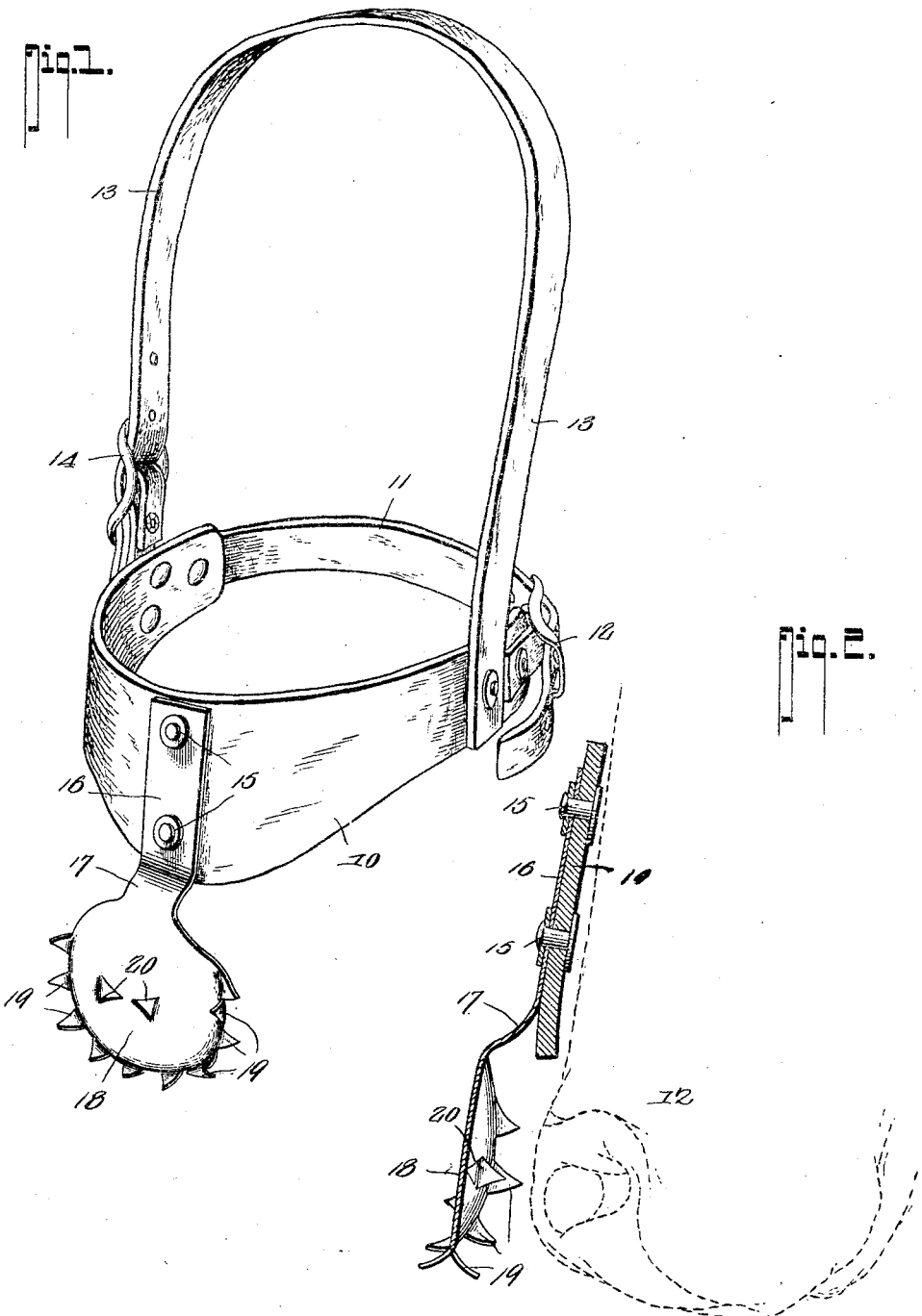
Witnesses
E. F. Stewart
C. N. Woodward
Charles W. Frick, Inventor.
by C. A. Snow & Co
Attorneys No. 779,701.

Patented January 10, 1905.

UNITED STATES PATENT OFFICE.

CHARLES W. FRICK, OF HAYTI, MISSOURI.

CALF-WEANER.

SPECIFICATION forming part of Letters Patent No. 779,701, dated January 10, 1905.

Application filed September 16, 1904. Serial No. 224,707.

*To all whom it may concern:*

Be it known that I, CHARLES W. FRICK, a citizen of the United States, residing at Hayti, in the county of Pemiscot and State of Missouri, have invented a new and useful Calf-Weaner, of which the following is a specification.

This invention relates to weaner-muzzles for attachment to calves, colts, or other animals to prevent them from nursing the mother animal, also to cause the mother animal when attempt is made to nurse to leave the nursing animal, and has for its object to simplify and improve the construction and increase the efficiency and reduce the expense of construction of devices of this character.

With these and other objects in view, which will appear as the nature of the invention is better understood, the same consists in certain novel features of construction as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device. Fig. 2 is an enlarged sectional detail of the yieldable spur-bearing plate and flexible band.

The improved device comprises a band 10, preferably of leather, relatively wide centrally and provided at the ends with a strap 11 and buckle 12 to enable it to be secured around the nose of the animal and also provided with a strap 13 and buckle 14 for leading around the animal's head behind the ears. By this means it is obvious that the band 10 may be firmly secured in position upon the head of the animal.

Attached centrally to the band 10, as by rivets 15, and extending forwardly of the same is a yieldable plate 16, preferably with an intermediate offset 17 and with the free end 18 rounded or in disk-like form and provided with a plurality of spurs 19 20, projecting both inwardly and outwardly. It will thus be obvious that when the device is attached to the animal's head the portion bearing the spurs will extend over the nose, (indicated by dotted lines at 21 in Fig. 2,) but held normally spaced therefrom by the offset 17, so that the animal will not be annoyed thereby so long as no inward pressure is applied to the portion having the spurs.

The plate 16 is of suitable yieldable metal, such as spring-steel, so that it will be readily depressed by outward pressure. Hence while not interfering with the ordinary feeding or drinking of the wearing animal any attempt to nurse the mother animal will cause the depression of the plate and prod the nose 21 and repel the wearing animal, and at the same time the outer spurs will prod the mother animal and cause it to leave the nursing animal. The spurs 19 are formed by serrating the rim of the enlarged end 18 of the plate and bending the serrations in opposite directions, and the spurs 20 are formed by cutting V-shaped clefts in the metal and bending the tongues thus released downwardly.

This makes a very inexpensive and efficient construction and may be readily adjusted to animals of various sizes and may be readily attached and detached, as required.

Having thus described the invention, what is claimed is—

1. A weaner-muzzle comprising a band for encircling the animal's nose adjacent to the nostrils and mouth and a yieldable plate connected to said band and projecting in advance of the same and maintained normally spaced from the animal's nose, said extended portion having projecting spurs.

2. A weaner-muzzle comprising a band for encircling the animal's head adjacent to nostrils and mouth and provided with a strap leading over the head behind the ears, and a yieldable plate connected to said band and extending in advance of the same and maintained normally spaced from the animal's nose, said extended portion having projecting spurs.

3. A weaner comprising a band for attachment to the head of the animal and a plate attached to said band and extending in advance thereof and with oppositely-extending spurs at its free end, said plate having an intermediate offset to maintain said spur-bearing end spaced from the animal's nose.

4. A weaner-muzzle comprising a flexible band having means for adjustable connection to the head of the animal adjacent to the nostrils and mouth, a strap connected to said band and leading around the head of the animal in the rear of the ears, and a plate attached to said band and extending in advance of the same and provided with oppositely-extending spurs in its free end, said plate having an intermediate offset for maintaining said spurs normally spaced from the animal's nose.

5. A weaner-muzzle comprising a band for attachment to the head of the animal and a yieldable plate attached to said band and extending in advance thereof and with a laterally-extended free end provided with a serrated periphery with the serrations bent alternately in opposite directions to provide oppositely-extending spurs.

In testimony that I claim the foregoing as my own I have hereto affixed my signature in the presence of two witnesses.

CHARLES W. FRICK.

Witnesses:
   Von Mayes,
   Virg. P. Adams.